United States Patent
Uhlenhuth

[11] Patent Number: 5,986,207
[45] Date of Patent: Nov. 16, 1999

[54] SIGNAL CARRYING ARRANGEMENT

[75] Inventor: Guenther Uhlenhuth, Roedental, Germany

[73] Assignee: Siemens Aktiengesellschaft, Munich, Germany

[21] Appl. No.: 08/997,478

[22] Filed: Dec. 23, 1997

[30] Foreign Application Priority Data

Jan. 24, 1997 [DE] Germany .................. 197 02 536

[51] Int. Cl.⁶ .................................................. H01B 11/02
[52] U.S. Cl. ................................................. 174/33; 174/34
[58] Field of Search ................... 174/33, 34; 336/187; 310/213

[56] References Cited

U.S. PATENT DOCUMENTS

| | | | |
|---|---|---|---|
| 2,119,853 | 6/1938 | Curtis | 174/27 |
| 3,571,613 | 3/1971 | Plate et al. | 174/27 |
| 5,033,091 | 7/1991 | Bond | 174/34 X |
| 5,045,368 | 9/1991 | Cosman et al. | 428/34.1 |

FOREIGN PATENT DOCUMENTS

| | | |
|---|---|---|
| 0 808 040 A2 | 11/1997 | European Pat. Off. . |
| 1942911 | 3/1971 | Germany . |
| 1765765 | 8/1971 | Germany . |
| 2149095 | 4/1973 | Germany . |
| 35 45 527 A1 | 7/1986 | Germany . |
| WO 90/10879 | 9/1990 | Germany . |
| 36 22 800 C2 | 7/1992 | Germany . |
| 44 11 863 A1 | 1/1995 | Germany . |
| 43 33 121 C2 | 10/1995 | Germany . |
| 44 31 204 A1 | 3/1996 | Germany . |
| 44 41 268 A1 | 5/1996 | Germany . |
| 1 549 307 | 9/1976 | United Kingdom . |
| 2 193 864 | 2/1988 | United Kingdom . |
| 2 257 320 | 1/1993 | United Kingdom . |
| 2 147 770 | 5/1995 | United Kingdom . |
| WO 84/04437 | 11/1984 | WIPO . |
| WO 95/01626 | 1/1995 | WIPO . |

*Primary Examiner*—Kristine Kincaid
*Assistant Examiner*—William H Mayo, III
*Attorney, Agent, or Firm*—Hill & Simpson

[57] ABSTRACT

An elongated element having at least one electrical and/or optical conductor, and at least one additional element allocated to the elongated element. This additional element has at least one function that stores messages and/or that processes messages.

16 Claims, 5 Drawing Sheets

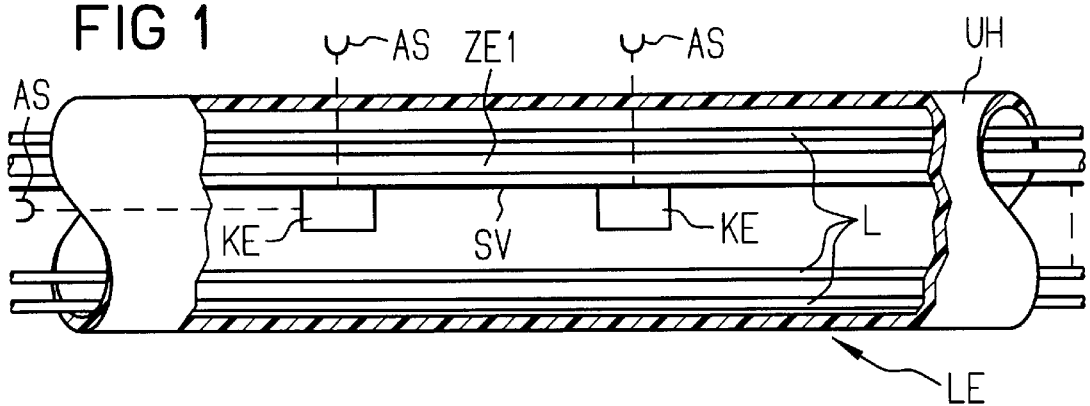
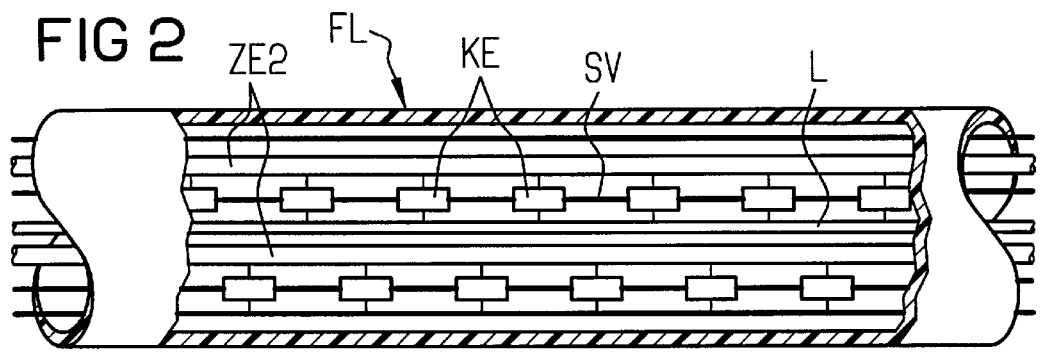
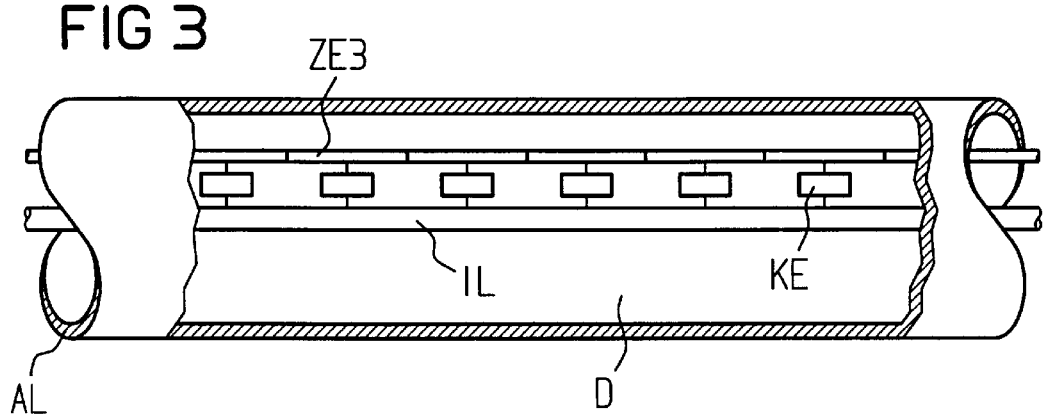

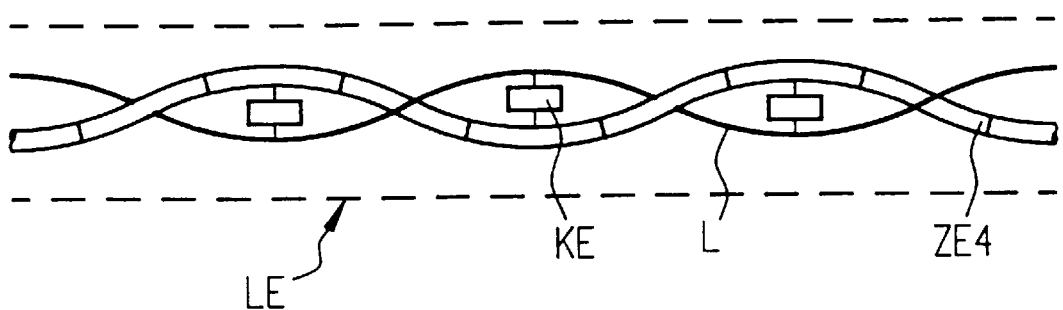
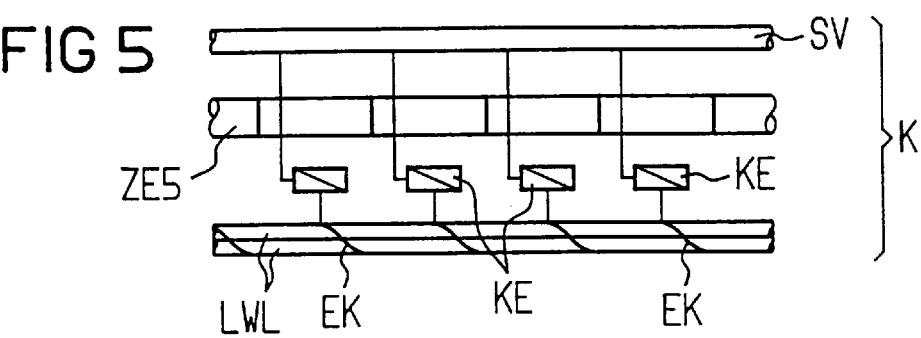
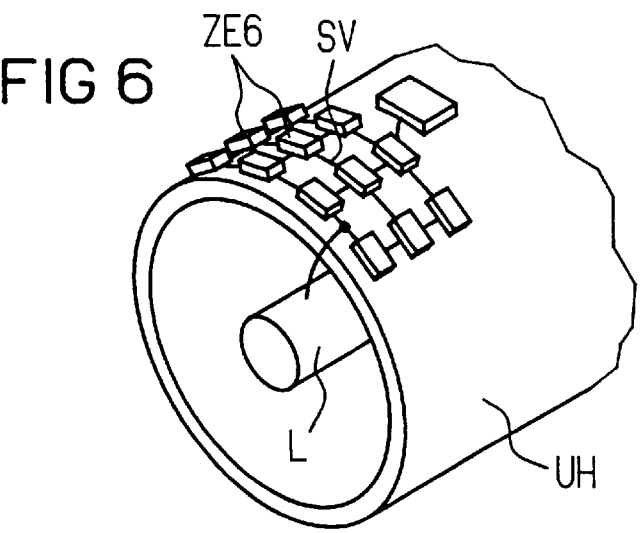

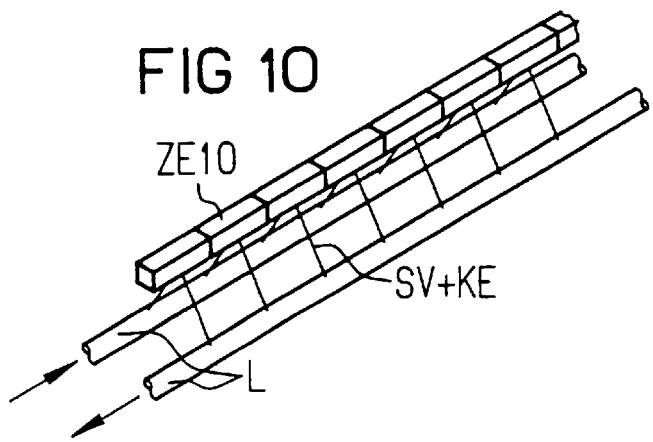
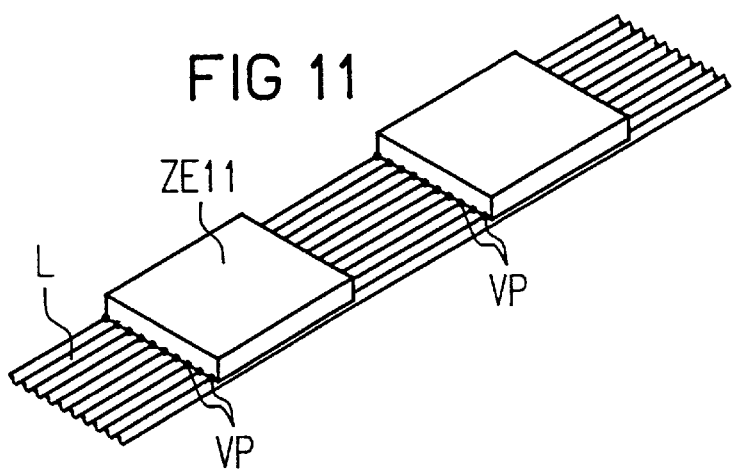
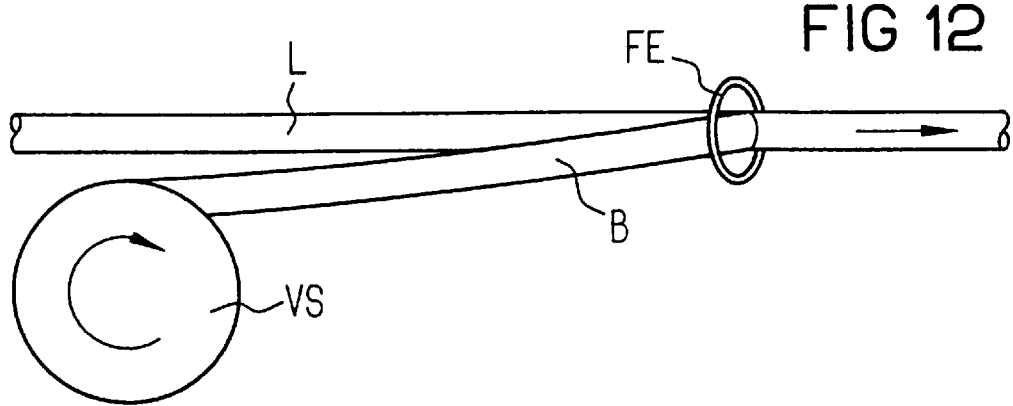

SIGNAL CARRYING ARRANGEMENT

BACKGROUND OF THE INVENTION

1. Field of the Invention

The present invention relates generally to the field of electromagnetic transmission devices such as optical or electrical transmission devices. More particularly, the present invention relates to an elongated element having at least one electrical and/or optical conductor and at least one additional element.

2. Description of the Related Art

Previously, communication networks have been organized in such a way that "intelligent" terminal devices are located at discrete locations. This may be, for example, at desks in offices, in computing centers, at service providers, in switching offices, etc. Discrete memories are then also located here in the form of hard disks, memory chips, magnetic cards, solid-state memories or similar devices. As a rule, lines are laid between these terminal devices to connect the devices. Various structures can thereby be used such as, for example, a star, tree, mesh or bus. Devices and amplifiers necessary for signal transmission or conversion are located at discrete locations between the terminal devices, depending on topology. The connections themselves are passive, consisting generally as a rule of copper wires, glass fibers or plastic fibers. The connection thereby respectively serves only as an end in itself.

It is for example known to insert amplifiers into the route of a line or of a cable. The cable is thereby interrupted in the region of the amplifier, and amplification is carried out in a separate structure (e.g., amplifier housing). Subsequently, a new cable piece is connected to the output of the amplifier, etc.

It is also known (WO 90/10879) to employ optical cables, which, in contrast to electrical cables, are very difficult to locate from the outside when buried. Externally permanent magnets may be attached at determined spacings, in order to locate the cables with a magnetic probe.

From DE 43 33 121 C2, a locating device is known having a magnetometer to locate magnetic objects in the ground. During a measurement, a person carrying out the measurement guides a magnetometer probe over the measurement path along a cord, whereby the measurement signals are retained by an electronic measurement device, taking into account the speed of the person carrying out the measurement. A plurality of detectable spaced emitters are provided on the cord, which respectively emit a path signal to the measurement device if the sensor passes over a spaced emitter of this type during the measurement. The emitters can also be realized in the form of electronic components in a chip, containing both the active electronic components and memory devices. When a spaced emitter is inserted, the cord is interrupted, and is led through a corresponding bore at the end side in the form of a loop.

From U.S. Pat. No. 5,045,368, a tube line (e.g., a gas line) is known for passing a flowing medium in which, for location in the buried state, marking means are arranged on the tube line in the form of passive electrical circuits which are tuned to a specific frequency. The marking means can be arranged in a predetermined pattern in order to obtain additional items of information. The individual marking means can be attached either to the line tube or can be successively strung on a cord.

SUMMARY OF THE INVENTION

One underlying object of the invention is to provide an elongated element of the type named above in such a way that its functionality is increased or improved. This object is solved according to the invention in that the additional element comprises at least one message-storing and/or message-processing function. The additional element is allocated to the elongated element, and the additional element is coupled to the conductor, or is capable of being coupled to the conductor.

A particular advantage of the elongated element with an additional element according to the invention is that with the additional element the items of information can be both transported and stored, processed, concentrated and arranged in concentrated form along the connections. A device of this sort is advantageous in comparison with the conventional network organization particularly at times of increasing network use (e.g. Internet), because e.g. previously concentrated nodes are permanently overloaded with the satisfaction of user demand and the retrieval of data from large connected, concentrated mass memories. However, if the data are present in distributed form via the inventive line (e.g., in a mesh network in a corresponding network organization), whereby they can also reorganize themselves (that is, e.g. at times of lower network load, transfer or duplicate to the locations at which they are often required), this procedure leads to a considerable reduction of the network load. The concentration points and/or the server are thereby simultaneously relieved of stress. Requests are then no longer made to the network and processed by the server, but rather by the network itself.

In current semiconductor memory technology, flat and very densely packed memories and/or functional units are being manufactured, which are suitable for installation in an elongated element, e.g. in a data or fluid transmission line. These semiconductor elements, in the form of computers, memory units and/or functional units can be arranged at spacings or continuously along the elongated element.

They can be attached to or installed in the elongated element centrally, coaxially or in arbitrarily distributed locations. They can be connected with one another directly or can be coupled to write and/or read units and operated via an external structure. The access to data stored therein can take place via taps at the ends, but also at discrete locations distributed over the length of the line.

For this purpose, an optical medium, or also an electrical transmission method, can be used, whose coupling elements are located inside or also outside the conductor. Thus, memory sizes, e.g. given in-house cablings, on the order of magnitude of several terabytes are conceivable. The internal memories of currently used devices based on semiconductor technology can thereby finally be completely or partially omitted. It can also be an advantage of this method that only very few high-RPM rotating elements (floppies, hard disks), or small ones, or none at all, are still required.

As in prior devices, the inventive element can be constructed in a housing, but can also be operated as a multi-functional element in the standard in-house and outdoor cabling as a normal conductor or cable with additional memory functions. In addition, the underlying structure allows the setting up of almost arbitrarily large memory capacity. It is conceivable to decentralize completely the networked structure that has arisen up to now for worldwide data traffic (e.g. WWW, Internet, telephone, etc.) with discrete decoupling points at which the "intelligence" is concentrated in the form of computers, and to distribute this structure via a transmission medium according to the invention, specifically, this may be a structure similar to a line, with semiconductor functions and/or with storage of electronic data or programs.

In this way, a worldwide network with integrated intelligence can for example be assembled. An apparatus cabling or in-house cabling according to this inventive principle can simultaneously contain the mass memory completely or partially, and on-board vehicle networks can, for example, be constructed intelligently. With these possibilities, it is also possible to present what is known as a "department store in the line." In this way, a provider for example distributes his services strategically in the network. The network operator distributes his services regionally in the vicinity of the customer, e.g. according to topological or geographical points of view.

Those offering the goods duplicate their offers in the vicinity of the most frequent users, and thereby also analyze search and purchase behavior in the line. Data objects are distributed in the mesh network, are offered, or collect items of information allocated to them. This may be, for example, quantities, piece counts, orders, modifications or claims that can be evaluated by the "original."

In the inventive construction, the data are thus no longer transmitted in networks or are only partially so transmitted; rather, they are available in the previous transmission medium. Thus, after being called, data can remain in the place to which they were previously transported, e.g. in temporary memory regions of the line, in the manner of a code function.

In order to enable the cited capacities to be achieved, according to the invention the elongated element with the additional elements is constructed as a line or cable in such a way that it forms a compound of transport means (conductor or line), pick-off and conversion elements (e.g. photonic/electrical/chemical/organic), and processing elements (e.g., memories and processors). As already indicated, the additional elements can be continuously or discontinuously distributed along the transport means, whereby the coupling onto the transport means can be permanent or according to need, and can also ensue at regular or irregular spacings.

Another variant application of the invention is the transformation of punctiform storage media (hard disks, RAM) into longitudinal storage media (conductors or lines). Thus, for example a corresponding length of a "memory line" combined in this way could be connected to the separate computer for expansion of the capacity.

For constructions of this sort, suitable microtechnology elements are used that are thereby available in particular for the converting elements (e.g., transceiver) and the intelligent processing units (memory and/or processor) in a matching small construction and at a correspondingly low price. A connection of the support and the elongated element (transport means) to form a processing unit is not necessary if the elongated element (transport means) itself carries out the processing. This would be the case if the processing elements are connected in series and simultaneously take over the transport via "passing on" (put-through function).

A possibly required current supply can ensue directly or inductively via a conductor of the elongated element. In addition, several strands of processing and transport units (conductors) can also be located in an elongated element, running for example in a double helix structure in the manner of DNA strands (DNA—deoxyribonucleic acid). In addition, the structures standard in cabling technology, such as coaxial, triaxial, spiral-shaped, parallel, braided, twisted, are conceivable.

In addition, intelligent elements can be brought into existing constructions in additive fashion, so that e.g. a conventional cable with properties of this sort can be expanded and improved. The invention is explained below in more detail on the basis of 14 figures that represent exemplary embodiments of the invention.

DESCRIPTION OF THE DRAWINGS

FIG. 1 illustrates an elongated element with an additional element in accordance with the present invention.

FIG. 2 illustrates a flat line with an additional element.

FIG. 3 illustrates a coaxial line with an additional element.

FIG. 4 illustrates a twisted pair arrangement.

FIG. 5 illustrates, as an elongated element, light waveguides with coupling to an additional element.

FIG. 6 illustrates the arrangement of additional elements on the sheath of an elongated element.

FIG. 10 illustrates an elongated element with duplex operation.

FIG. 11 illustrates a substrate consisting of n conductor paths.

FIG. 12 illustrates the formation of the substrate by means of a formation apparatus.

DESCRIPTION OF THE PREFERRED EMBODIMENTS

Figure 7:
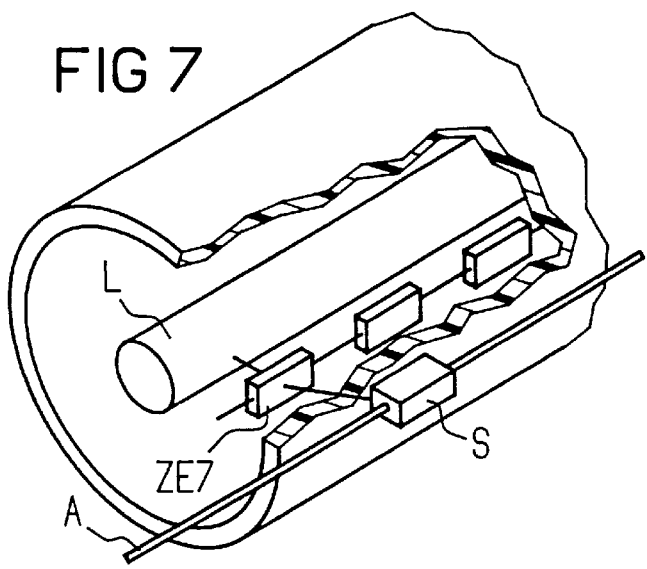
FIG. 7 illustrates a coupling via a transmitter.

FIG. 1 shows an elongated element LE for message transmission, fashioned in the form of a cable with an outer sheath UH as a cable coating and with at least one electrical and/or optical conductor L. According to the invention, at least one additional element ZE1 is attached inside the sheath UH, which can be arranged so as to run continuously (as shown), in interrupted fashion or segment-by-segment.

This additional element ZE1 consists, for example, of a structure similar to a line, with semiconductor functions, so that messages can be stored and/or processed. The information-oriented access to this additional element or elements ensues via coupling units KE, via which, according to the type of transmission, electrical and/or optical items of information are coupled in from a separate information channel or from one of the existing conductors L. For "correspondence" with the additional element ZE, terminals AS (e.g., terminals at the transmitter and/or receiver) can be provided at the ends of the elongated element LE, or also at spacings between them, via which, as warranted, additional accesses to the additional element ZE can be created. The reading out or, respectively, processing of the items of information from the additional element ZE can also ensue via radio, whereby the transmitter can also be arranged inside or outside the elongated element LE. However, the reading out can also ensue via a conductor L, if this conductor is for example contacted or coupled. A separate conductor can also be provided for a processing of this sort, which can run inside or outside the elongated element LE.

For the power supply to the modules, separate conductors SV can be provided, or the power supply can ensue additionally via the already-present conductor L. The power supply can ensue inductively, via additional conductors or via a separate external conductor.

As an exemplary embodiment, FIG. 2 shows the design of a flat conductor FL. Here for example two additional elements ZE2 are embedded (indicated by the rectangular boxes), which can be reached from a conductor L via coupling elements or, respectively, coupling units KE. The power supply is inserted as a separate conductor SV.

FIG. 3 illustrates a coaxial cable, whereby here the coupling to several additional elements ZE3 separate from one another ensues via the coupling units KE between the inner conductor IL and the additional elements ZE3. The inner conductor IL is thus at the same time an information channel for the functional units of the additional elements ZE. The overall additional element here consists, for example, of separate consecutive additional elements ZE3 as information units (indicated by the rectangular boxes), which are separate from one another. A coupling unit KE must then also be available for each additional element ZE3 or, respectively, each information unit. The additional elements ZE3 could, for example, run in the dielectric D. The outer conductor AL surrounds the inner conductor IL, the coupling elements KE and the additional elements ZE3.

FIG. 4 gives a graphic illustration of a twisted pair arrangement, whereby an additional element ZE4 is twisted with a conductor L for the items of information. Coupling units KE are indicated for this purpose. The whole arrangement is located in an elongated element LE, indicated by broken lines. This can be constructed with or without a shielding.

FIG. 5 indicates an additional element ZE5 with the memory and functional units along light waveguides LWL in a cable K. The coupling elements KE5 here comprise special couplings EK for the optical transmission of the items of information. The power supply SV ensues via a separate conductor.

FIG. 6 explains that additional elements ZE6 can also be attached in partial form on the sheath UH of an elongated element LE, e.g. a cable or a line with at least one conductor L. There then again ensues here for example the coupling to the conductor L. According to the partitioning (thorough or partial) of the overall additional element ZE6, the coupling and the power supply are then carried out. The individual functional units or, respectively, additional elements ZE6 can also be coupled together in network fashion.

In FIG. 7, it is shown that the coupling or, respectively, the "correspondence" with the additional element ZE7 or the individual elements thereof is carried out using a transmitter S, which is equipped with a transmission or, respectively, receiving antenna A. The remaining arrangements can here also be taken over as in the preceding examples.

Figure 8:
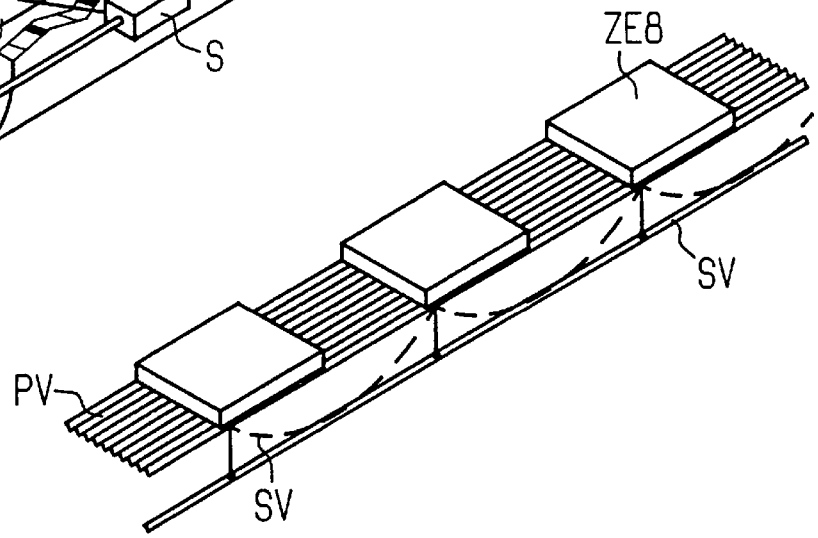
FIG. 8 illustrates a "put-through" arrangement without a transport medium.

FIG. 8 shows a "put-through" arrangement without a transport medium. Several additional elements ZE8 are connected one after the other as processing units, and are respectively connected with 2 . . . n parallel lines or, respectively, connections PV. The data transport takes place via these lines PV through the additional elements ZE8, and thus requires no separate conductor. An external line is used only for power supply SV.

Figure 9:
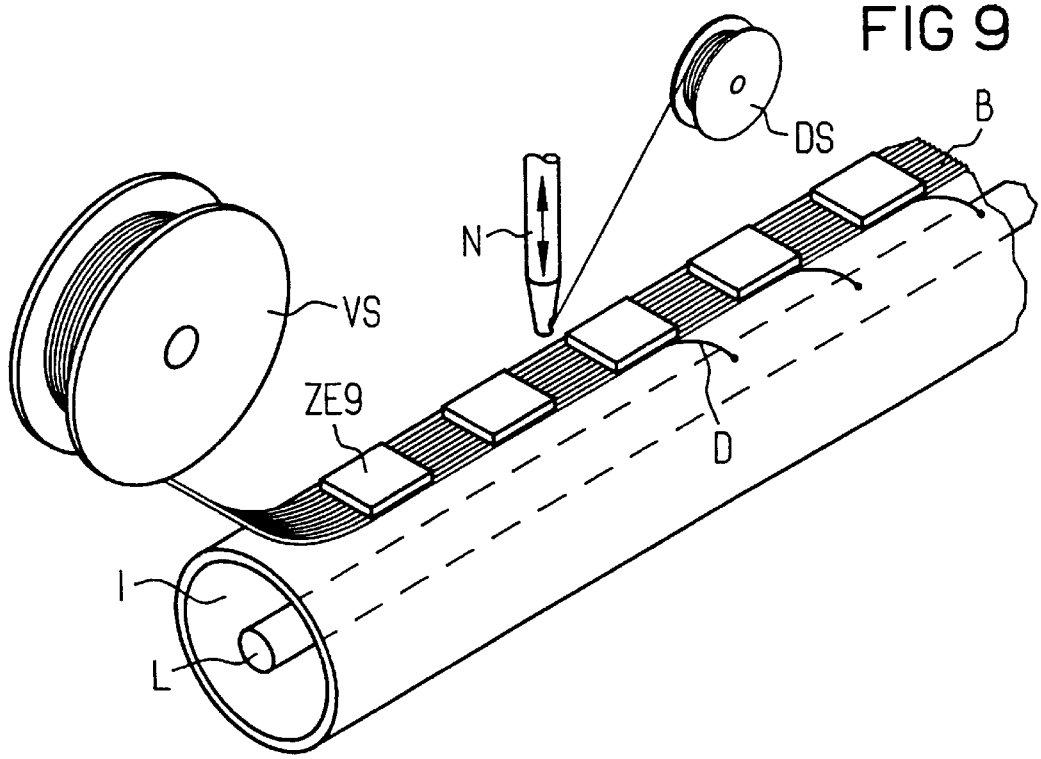
FIG. 9 illustrates the attachment of additional elements or, respectively, processing elements.

FIG. 9 illustrates the attachment of additional elements or, respectively, processing units ZE9, which are located on a substrate, e.g. a strip B, and are through-contacted onto a conductor L. The required length of successive additional elements ZE9, from which they are drawn, attached and contacted, is located on a supply spool VS. This strip is unwound and contacted with a conductor L, which takes over the data transport or the power supply function. The contacting ensues for example using a needle N with a soldering function, which pierces the insulation I and solders on a wire D drawn from a supply spool VS.

FIG. 10 indicates that the flow of information can also ensue via duplex operation on the conductors L, as shown by the arrows. Coupling units KE and power supply SV supply the additional element or, respectively, the additional elements ZE10, whereby it/they can also be formed from individual modules, as was indicated previously.

FIG. 11 shows a substrate consisting of n conductor paths L, underneath which additional elements or, respectively, processing units ZE11 are glued. Additional elements ZE11 are contacted via connection points VP. The substrate can be substantially broader than the central elements ZE11, and thereby also flexible. The substrate can thereby also consist of parallel data lines. As a result of the flexibility, it can be surrounded by e.g. a cable, by folding or helical wrapping. For this purpose, a means according to FIG. 12 can be used.

FIG. 12 shows the sheathing of a conductor element L with a flexible substrate that already contains the additional elements ZE, whereby the substrate is formed around the cable or, respectively, the conductor L in the form of a strip B with known strip forming means FE, and thus encloses the conductor and its insulation.

Figure 13:
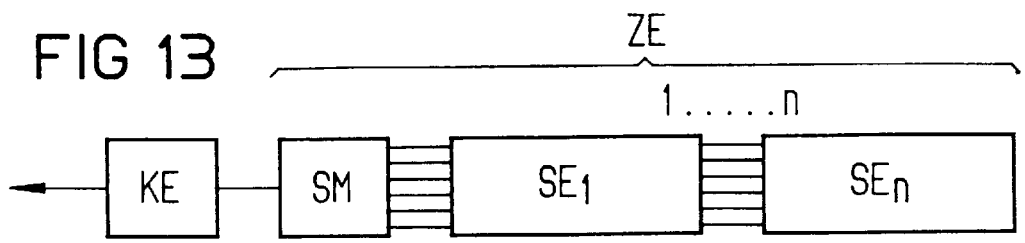
FIG. 13 illustrates a possible composition of functional units inside an additional element.

FIG. 13 indicates the principle of the arrangement of an additional element ZE, formed from a memory manager SM and several memory units SE1 to SEn. For the coupling of a substrate, i.e. of a bearer element with contacted additional elements ZE, to an electrical or optical conductor or via radio, a corresponding coupling unit JE is respectively arranged. This is only an exemplary embodiment; other combinations can also be assembled as required. However, the principle of the invention is that items of information can be stored and processed along the elongated element.

Figure 14:
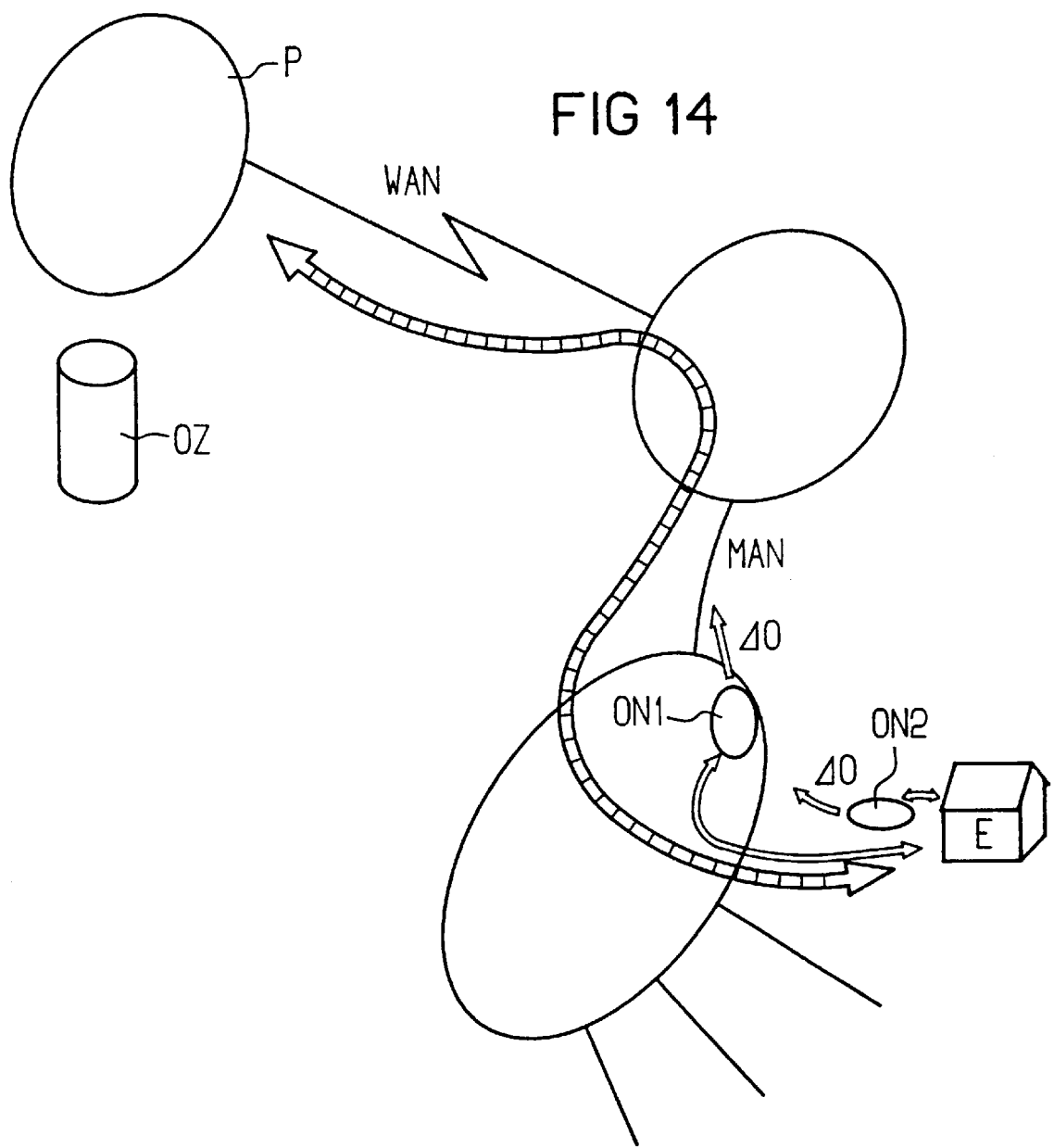
FIG. 14 illustrates a network structure.

FIG. 14 shows a data flow chart from which it follows that the earlier data paths from the provider or, respectively, information owner P run directly to the end subscriber E, whereby the corresponding objects OZ were centrally stored. In contrast, with the new data network system the objects can be distributed over the entire data network system, whereby at these locations, e.g. ON1 and/or ON2, requests concerning modified data ΔO of one object or several objects can be carried out or, respectively, processed. In this way, several networks can also work together, such as for example wide area networks (WAN) and metropolitan area networks (MAN).

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

I claim as our invention:

1. A signal carrying arrangement comprising:
   an elongated element leaving at least one electromagnetic conductor via which messages are communicated; and
   at least one additional elongated element located between origination and termination points of said elongated element and communicatively coupled to said at least one electromagnetic conductor, at least one additional elongated element being co-extensive with said elongated element and being selected from the group of elements consisting of processing elements and storage elements.

2. The elongated element according to claim 1, wherein the elongated element is a flat line.

3. The elongated element according to claim 1, wherein the elongated element is a coaxial line.

4. The elongated element according to claim 1, wherein the at least one electromagnetic conductor of the elongated element is twisted with the at least one additional elongated element as a twisted pair arrangement.

5. The elongated element according to claim 1, wherein the elongated element is an optical or electrical cable, surrounded by a sheath and having coupling units associated therewith.

6. The elongated element according to claim 5, wherein the coupling units are inside the sheath.

7. The elongated element according to claim 5, wherein a coupling units are outside the sheath.

8. The elongated element according to claim 1, wherein the at least one additional elongated element is divided into individual segments, and a separate coupling unit is associated with each segment.

9. The elongated element according to claim 5, wherein the at least one additional elongated element is on the sheath.

10. The elongated element according to claim 1, wherein coupling units couple directly onto the conductor of the elongated element.

11. The elongated element according to claim 1, wherein at least one radio transmitter is connected to the at least one additional elongated element.

12. The elongated element according to claim 1, further comprising power supply conductors connected to the at least one additional elongated element.

13. The elongated element according claim 1, wherein the at least one additional elongated element is arranged in the elongated element which operates in duplex.

14. The elongated element according to claim 1, wherein each said additional elongated element further comprising at least one memory unit, and memory manager.

15. The elongated element according to claim 1, wherein data concerning the at least one additional elongated element is distributed along an information network, associated with the elongated element.

16. The elongated element according to claim 1, wherein data for identifying the elongated element is stored in the at least one additional elongated element.

* * * * *